March 28, 1939.　　　R. S. NELSON　　　2,152,269
ABSORPTION REFRIGERATING APPARATUS
Original Filed July 17, 1933
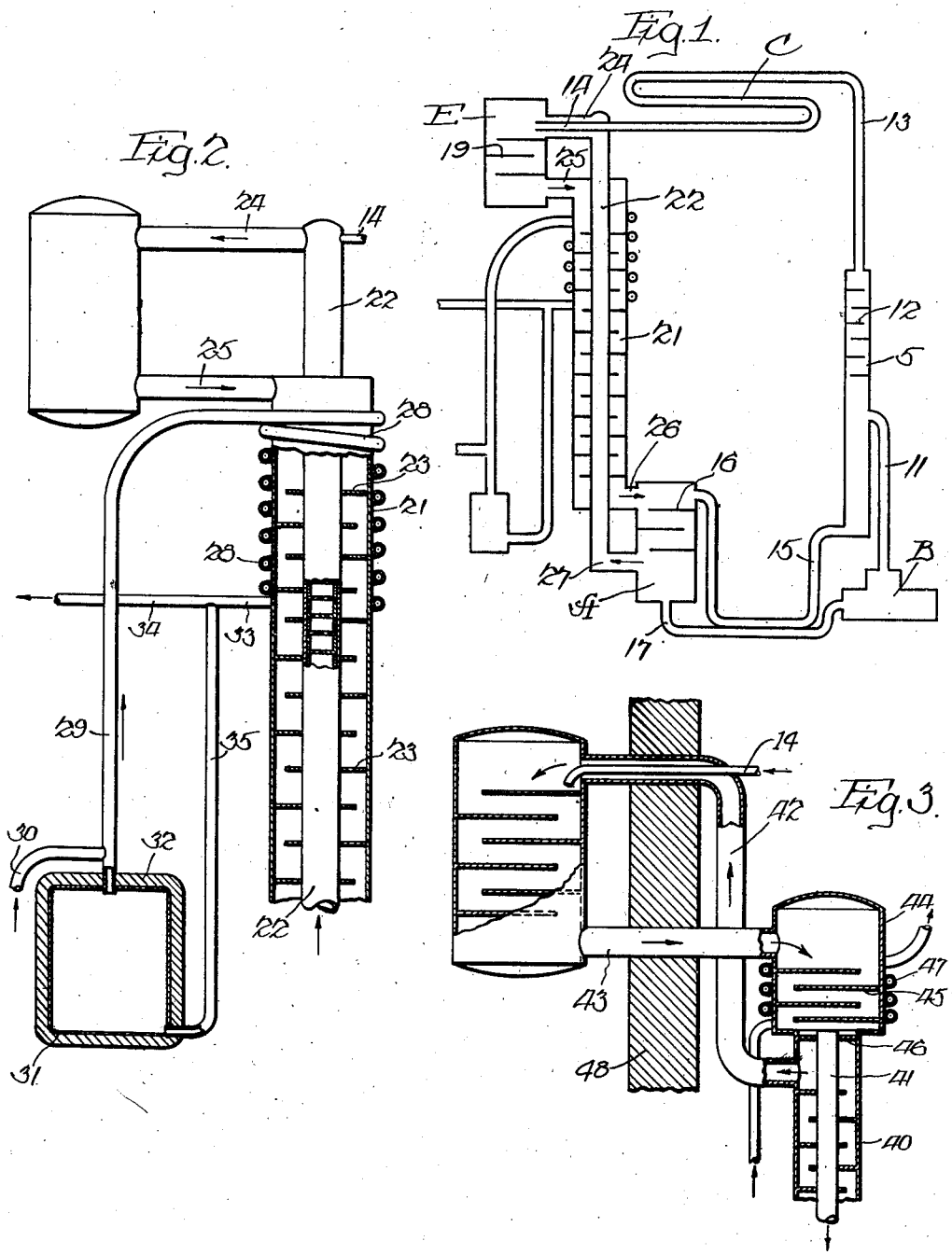
Inventor.
Rudolph S. Nelson.
By Harry S. Demars, Atty.

Patented Mar. 28, 1939

2,152,269

UNITED STATES PATENT OFFICE 2,152,269

ABSORPTION REFRIGERATING APPARATUS

Rudolph S. Nelson, Rockford, Ill., assignor to The Hoover Company, North Canton, Ohio, a corporation of Ohio Application July 17, 1933, Serial No. 680,748
Renewed August 16, 1938

10 Claims. (Cl. 62—119.5)

This invention relates to continuous absorption refrigerating apparatus and more particularly to means adapted to be associated with an ordinary household absorption refrigerating unit for cooling drinking water, beer and the like and for maintaining the same cold.

Another important object of the invention relates to the utilization of a portion of the liquid refrigerant in the evaporator, and preferably the residue refrigerant therein, to promote the circulation of the inert gas commonly employed in continuous absorption systems. This circulation is accomplished without the aid of any moving parts or the application of external heat.

In continuous absorption refrigerating apparatus of the type using an inert gas as a pressure equalizing medium, it is customary to provide a gas heat exchanger between the evaporator and the absorber to effect an economy of operation as the inert gas circulates between these vessels.

It is an object of the present invention to construct the gas heat exchanger mentioned above so as to adapt it to the cooling of drinking water or other fluid and at the same time to promote the rapid circulation of the inert gas in its circuit.

It is a further object of the invention to provide an arrangement which may be associated with a gas heat exchanger of the type mentioned or with other parts of an absorption refrigerating system which are at a comparatively low temperature for the purpose of cooling drinking water or other fluid to a temperature sufficiently low to make it palatable.

Other objects and advantages reside in certain novel features of the arrangement and the construction of the parts of the apparatus so as to provide a simple construction and permit a compact assembly and in certain other features as will be apparent from a consideration of the following description taken in connection with the accompanying drawing, in which:

Figure 1 is a diagram illustrating a continuous absorption refrigerating apparatus of the type using an inert gas with means constructed in accordance with the present invention for cooling drinking water associated with the gas heat exchanger thereof.

Figure 2 is a view in elevation of a portion of the apparatus in Figure 1, certain parts being cut away or shown in cross section to better illustrate the construction.

Figure 3 is a view in elevation of a fragmentary portion of a modified form of the invention, certain parts being cut away or shown in cross section.

Referring to the drawing in detail, Figure 1 illustrates a continuous absorption refrigerating unit consisting of a boiler B, a gas separation chamber 5, a condenser C, an evaporator E, and an absorber A, all of which vessels are connected by various conduits to make up a system of a more or less conventional sort.

This system may be charged with ammonia, water and hydrogen and be operated in accordance with known principles. A small conduit 11 is connected to the top of the boiler B so as to act as a gas lift pump and convey absorption liquid and refrigerant gas from the boiler into the separator 5. The upper portion of the gas separating chamber is provided with baffle plates 12 which act as a rectifier and above this point the chamber 5 is connected by means of a conduit 13 to the condenser. As the condensed refrigerant is liquefied it flows through the conduit 14 into the evaporator.

The absorption liquid weakened in the boiler and the gas separating chamber leaves the latter through the conduit 15 and flows into the top of the absorber. The absorber is provided with baffle plates as indicated in 16. The absorption liquid flows down over these plates and then flows back to the boiler through the conduit 17. The conduits 15 and 17 may be in heat exchange relation as illustrated.

An auxiliary pressure equalizing medium such as hydrogen or other inert gas is circulated between the evaporator and the absorber. This gas circuit may include the heat exchanger shown in detail in Figure 2. As shown, this device may consist of a vertically disposed cylinder 21 having a vertically extending conduit 22 passing centrally therethrough. Baffle plates or deflectors 23 are located at spaced points along the interior of the cylinder 21 so as to cause the gases flowing downwardly in the cylinder 21 to pass across the outer surface of the central pipe 22. The upper end of the pipe 22 is connected to the top of the evaporator by the conduit 24 and conveys gas from the top of the pipe 22 into the evaporator. The conduit 24 may also house the refrigerant supply conduit 14 as indicated in Figure 1.

The lower end of the evaporator is connected to the top of the cylinder 21 by means of a conduit 25.

As indicated in Figure 1 the lower end of the cylinder 21 may be connected to the top of the absorber above the baffle plates 16 by means of a conduit 26 while the lower portion of the absorber is connected to the central pipe 22 of the gas heat exchanger by means of conduit 27.

It will be apparent to those skilled in the art that in the arrangement just described, the refrigerant will pass through a cycle from the boiler B through the conduit 11, gas separating chamber 5, conduit 13, condenser C, conduit 14, evaporator E, conduit 25, the cylinder 21 through conduit 26 into the absorber and thence through the conduit 17 back to the boiler.

The absorption liquid will pass through a cycle from the boiler B, through the gas lift pump, conduit 11, lower portion of the gas separating chamber 5, the conduit 15, and through the absorber A, back to the boiler through the conduit 17.

The inert gas will pass through a cycle starting with the evaporator E, downwardly over the baffle plates 19 therein, through the conduit 25, the cylinder 21, the conduit 26, and downwardly through the absorber and thence through the conduit 27 upwardly through the central pipe 22 and back to the evaporator through the conduit 24.

As is well known, the inert gas rising from the absorber is not only relatively free from the refrigerant but is also relatively warm because of the heat given off in the absorption of the refrigerant by the absorption fluid in the absorber. This relatively warm and pure inert gas passes upwardly through conduit 22 and heats the residue liquid refrigerant passing downwardly over baffles 23 causing the evaporation thereof. This evaporation takes place into the inert gas within chamber 21 and cools the same, thus increasing the density of the inert gas. It is at once apparent that the density of the refrigerant gas and of the inert gas within casing 21 considerably over-balances the weight of the relatively warm and pure inert gas in the other vertical leg 22 of the gas circuit. The result is a rapid circulation of the inert gas through its circuit and greatly increased efficiency in this portion of the apparatus all of which is obtained with a very simple and inexpensive arrangement of parts and without the introduction of moving parts into the system.

It will thus be seen that as the cold gases pass downwardly through the cylinder 21 of the gas heat exchanger they will take up heat from the gases passing upwardly through the pipe 22. In accordance with the principles of the present invention heat may also be taken up by the cold gases passing downwardly in the upper portion of the cylinder 21 from drinking water or the like which is to be cooled. To bring the drinking water into heat transfer relation with the cold gases, a coil of pipe 28 is provided around the upper portion of the cylinder 21. The top of the coil 28 is connected by means of a conduit 29 to a supply pipe 30 and to a reservoir 31 which may be suitably insulated as by means of insulating jacket 32. The lower end of the coil 28 is connected by means of a conduit 33 to a discharge pipe 34 and to a conduit 35 connected to the bottom of the reservoir 31. The conduit 30 may be connected to city water mains and a valve may be provided in the conduit 34 for regulating the flow of water through the drinking water cooling system. For the cooling of beer, the conduit 30 may be connected to a barrel maintained under pressure by carbon dioxide gas or the like. Thus, the arrangement may be such that when no fluid to be cooled is entering through the conduit 30 or leaving through the conduit 34 a local cycle for the flow of the fluid between the coil 28 and the reservoir 31 will be set up due to thermosiphon effect.

It is of course possible to cool drinking water by means of a coil or other transfer means associated directly with the evaporator of a refrigerating system. Such an arrangement has the disadvantage that some of the cooling effect available for cooling a food storage compartment or the like is used up in cooling the drinking water thus rendering the apparatus less efficient.

In accordance with the present invention, however, the drinking water is cooled without unduly increasing the load on the system. The gas heat exchanger may be located outside of the food storage compartment of the refrigerator cabinet and since this portion of the heat exchanger is colder than the surrounding air it normally takes up heat from the atmosphere. Since the temperature of the gas heat exchanger is ordinarily at least as low as the temperature on the inside of the refrigerator cabinet, it provides an excellent means for cooling drinking water to a temperature which makes the water palatable for human consumption.

Where drinking water is desired at a temperature somewhat lower than the temperature normally prevailing in the gas heat exchanger or for use in those types of apparatus where the gas heat exchanger operates at a slightly higher temperature than the refrigerator cabinet, the arrangement of Figure 3 may be employed. In this arrangement the gas heat exchanger is somewhat similar to that of the arrangement of Figure 2 in that it includes a cylinder which is vertically disposed as indicated at 40 and a pipe or conduit 41 located centrally thereof and extending from end to end. In the arrangement of Figure 3, the conduit 42 connects the upper portion of the cylinder 40 to the top of the evaporator E. The lower portion of the evaporator E is connected by means of a conduit 43 with a small auxiliary evaporator made up of a cylinder 44 provided with a number of baffle plates 45 on the inside thereof. The lower portion of the cylinder 44 is connected to the top of the vertically extending pipe 41, this pipe entering the vessel 44 just below the lower baffle plate 45. A partition 46 prevents the flow of gases from the top of the cylinder 40 into the vessel 44. A coil for cooling drinking water or the like may be wrapped around the vessel 44 as indicated at 47. This coil may be associated with the reservoir as indicated in Figure 2 or drinking water may pass through this coil in the direction indicated by the arrows without the use of any reservoir.

It will be noticed that in the arrangement of Figure 3 the inert gas passes out of the evaporator through the lower conduit 43 into the auxiliary evaporator vessel 44 then downwardly through the central pipe 41. This pipe may be connected to the top of the absorber similar to the arrangement in Figure 1 so that the inert gas after it passes downwardly through the absorber returns to the evaporator through the outer cylinder 40 of the gas heat exchanger and through the gas conduit 42.

It is well known that a refrigerant does not always completely evaporate in the main evaporator of a refrigerating system and it is proposed in accordance with the principles of the present invention to cause this portion of the refrigerant to evaporate in the auxiliary evaporator 44, this vessel being at a higher temperature than the main evaporator E. The refrigerant will still evaporate at a sufficiently low temperature to cool the drinking water, however. The vessel 44 and the gas heat exchanger are preferably located outside of the food storage compartment of the cabinet, the wall of which is shown at 48 in Figure 3. While only two embodiments of the invention have been shown and described herein, it is obvious that many changes may be made without departing from the spirit of the invention or the scope of the annexed claims.

I claim:

1. In a continuous absorption refrigerating system of the type in which an inert gas is used as a pressure equalizing medium, the combination with the evaporator and the absorber thereof, of a conduit for conveying the inert gas from the evaporator to the absorber and a conduit for conveying the inert gas from the absorber to the evaporator, a portion of the first mentioned conduit being located below the evaporator and so connected to the evaporator that the liquid refrigerant not evaporated in the evaporator may flow into said portion and produce additional cooling by evaporating therein at a higher temperature than that normally prevailing in the evaporator, said second mentioned conduit being disposed in heat transfer relation with said portion and liquid conveying means independent of said system disposed in heat transfer relation with said portion of said first mentioned conduit, the arrangement being such that heat is transferred from said liquid conveying means and from the inert gas in said second mentioned conduit to the cold inert gas passing from the evaporator through said portion and also to the liquid refrigerant passing from the evaporator through said portion.

2. The method of utilizing the cooling capacity contained in residue liquid refrigerant remaining in the bottom of the evaporator of a continuous absorption refrigeration system employing an auxiliary pressure equalizing medium which method comprises passing relatively warm portions of the equalizing medium in heat exchange relation to said residue to cause evaporation of the same, and passing a fluid to be cooled into heat exchange relation, but out of contact with said evaporating residue and independently of said system.

3. The method of utilizing the cooling capacity contained in residue liquid refrigerant remaining in the bottom of the evaporator of a continuous absorption refrigeration system having an evaporator and an absorber located in a fluid circuit system employing an auxiliary pressure equalizing medium, which method comprises passing relatively warm portions of the equalizing medium in heat exchange relation, but out of contact with said residue, evaporating said residue into other portions of said equalizing medium, whereby some heat is withdrawn from said equalizing medium to increase the density of portions of the medium to promote the rapid circulation thereof, and passing a fluid to be cooled into heat exchange relation, but out of contact with said evaporating residue and independently of said system whereby heat is withdrawn from said fluid to cool the same.

4. The method of operating a refrigerating system of the continuous absorption type employing an evaporator and an absorber in circuit and using a pressure equalizing medium, which comprises utilizing a portion of the liquid refrigerant not utilized in the main evaporator to promote the circulation of the equalizing medium and to cool another liquid, said method including the steps of bringing relatively warm portions of said medium into heat exchange relation, but out of contact with said refrigerant to facilitate the evaporation thereof whereby the density of at least a portion of the medium in the equalizing medium circuit is increased, and passing another liquid into heat exchange relation but out of contact with said evaporating refrigerant and independently of said system whereby said liquid is cooled.

5. The method of operating a refrigerating system of the continuous absorption type employing an evaporator and an absorber in circuit and using a pressure equalizing medium, which comprises using a portion of the liquid refrigerant not utilized in the main evaporator to cool another liquid by bringing relatively warm portions of the medium into heat exchange relation, but out of contact with said refrigerant to facilitate the evaporation of the same, and passing said other liquid into heat exchange relation, but out of contact with the refrigerant as it evaporates to thus cool said liquid.

6. In a continuous absorption refrigerating system of the type using a refrigerant medium and an auxiliary pressure equalizing medium, the combination with the evaporator and absorber thereof, of a gas heat exchanger for exchanging heat between the refrigerant and pressure equalizing mediums and having a portion located below said evaporator, a liquid conduit disposed in heat transfer relation with said portion of the gas heat exchanger and means independent of said refrigerating system for supplying liquid to be cooled to said conduit and for conveying the same away from said conduit, the arrangement being such that the temperature of the liquid is lowered as it passes through said conduit and heat is transferred from the liquid in the conduit to one of said mediums in the heat exchanger.

7. In a continuous absorption refrigerating system of the type using a refrigerant medium and an auxiliary pressure equalizing medium, the combination with the evaporator and the absorber thereof of a gas heat exchanger for exchanging heat between the refrigerant and pressure equalizing mediums and having a portion located below said evaporator, a liquid conduit disposed in heat transfer relation with said portion of the gas heat exchanger, a device forming a reservoir located below said liquid conduit, means independent of said refrigerating system adapted to circulate liquid between and through said conduit and said device and means for supplying liquid to said circulating means at one portion thereof and for removing liquid from another portion thereof, the arrangement being such that the temperature of the liquid is lowered as it passes through said conduit and heat is transferred from the liquid in the conduit to one of said mediums in the heat exchanger.

8. In a continuous absorption refrigerating system of the type using a refrigerant medium and an auxiliary pressure equalizing medium, the combination with the main evaporator and the absorber thereof, of means for circulating the auxiliary medium between and through the evaporator and the absorber, said means including a heat exchanger for exchanging heat between said mediums and having a small auxiliary evaporator located below the main evaporator and adapted to receive unevaporated refrigerant from the main evaporator, a conduit independent of said refrigerating system for conveying liquid into heat transfer relation with said auxiliary evaporator and means for supplying liquid to said conduit and for removing liquid therefrom, the arrangement being such that the temperature of the liquid is lowered as it passes through said conduit and heat is transferred from the liquid in the conduit to the refrigerant in the auxiliary evaporator thereby causing the latter to evaporate at a higher temperature than the temperature of the main evaporator.

9. In a continuous absorption refrigerating system of the type using a refrigerant medium and an auxiliary pressure equalizing medium, the combination with the main evaporator and the absorber thereof, of means for circulating the auxiliary medium between and through the evaporator and the absorber, said means including a heat exchanger for exchanging heat between said mediums and having a small auxiliary evaporator located below the main evaporator and adapted to receive unevaporated refrigerant from the main evaporator, a conduit independent of said refrigerating system for conveying liquid into heat transfer relation with said auxiliary evaporator and means for supplying liquid to said conduit and for removing liquid therefrom, the arrangement being such that the temperature of the liquid is lowered as it passes through said conduit and heat is transferred from the liquid in the conduit to the refrigerant in the auxiliary evaporator and to the auxiliary medium flowing therethrough.

10. In a continuous absorption refrigerating system of the type using a refrigerant medium and an auxiliary pressure equalizing medium, the combination with the main evaporator and the absorber thereof, of means for circulating the auxiliary medium between and through the evaporator and the absorber, said means including a heat exchanger for exchanging heat between said mediums and having a small auxiliary evaporator located below the main evaporator and adapted to receive unevaporated refrigerant from the main evaporator, means associated with said auxiliary evaporator but providing a fluid circuit out of communication therewith, and means for circulating fluid through said fluid circuit independently of said system whereby heat is transferred from said fluid to said refrigerating medium.

RUDOLPH S. NELSON.